3,343,206
HINGE DEVICE
Tiovo Viktor Mannerheimo, 296 Whitehorse Road,
Nunawading, Victoria, Australia
Filed Dec. 21, 1964, Ser. No. 419,789
Claims priority, application Australia, Jan. 21, 1964,
39,955/64
4 Claims. (Cl. 16—146)

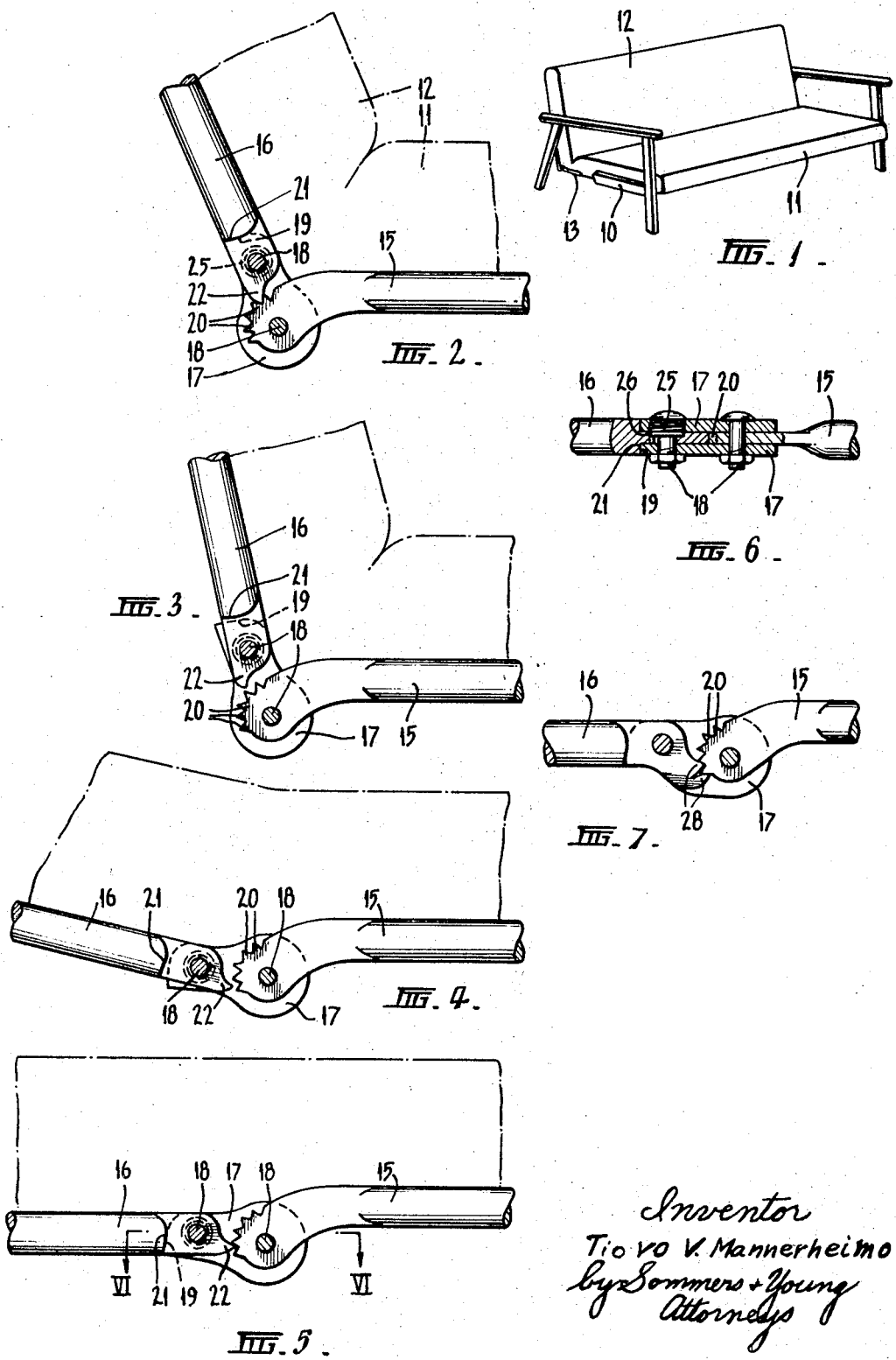

This invention relates to a hinge device which may be locked in a number of predetermined positions, and is suitable for use in chairs, settees, or the like, in which the position of the back or foot rest is adjustable.

It is the principal object of this invention to provide a hinge device of simple and inexpensive construction which can be readily locked in any one of a number of predetermined positions and can be quickly and easily adjusted from one position to another.

With the above stated principal objects in view, there is provided according to the present invention a hinge device comprising two arms each pivotally connected at one end to a connector link for relative angular movement about respective parallel axes, said ends of the arm being arranged to interengage when the arms are in a plurality of predetermined angular relations, and one of the arms being adapted to lockably engage the connector link in each of said angular relations to prevent relative angular movement between the arms in one direction, the interengaging ends being releasable upon relative angular movement of the one arm relative to the connector link in the other direction.

Conveniently the end of one of the arms is provided with a plurality of teeth arranged on a pitch circle concentric with the pivot axis of that end. The end of the other arm is provided with a single tooth which can engage with any one of the teeth on the one arm and the other arm is provided with a projection which abuts the connector link to effect locking of the arms in the desired angular relation.

Adjustment of the angular relation of the arms is effected by first angularly moving the other arm with one tooth relative to the connector link in the direction permitted by the position of the projection so as to move the tooth out of engagement with the teeth on the one arm. The arm with the one tooth and the connector link are then angularly moved in unison about the pivot connection between the remaining arm and the connector link until the two arms are in the required angular relation and then the arm with the one tooth is angularly moved relative to the connector link to bring the teeth back into engagement, and abut said arm against the projection on the connector link.

The invention will be more readily understood from the following description of one practical arrangement of the hinge device with reference to the accompanying drawings.

In the drawings:

FIGURE 1 is a diagrammatic representation of a settee having a reclining back rest pivotally connected to the frame by the hinge device.

FIGURE 2 is an enlarged detailed view of the hinge device.

FIGURES 3, 4 and 5 show the various steps in adjusting the hinge device from the position shown in FIGURE 2 to that shown in FIGURE 5.

FIGURE 6 is a sectional view along line VI—VI in FIGURE 5.

FIGURE 7 is a view of a modified form of the hinge device.

Referring now to the drawings, the settee in FIGURE 1 comprises a frame 10 having a fixed seat 11 and a back rest 12 pivotally connected to the seat by a hinge 13 at each end thereof.

Referring now to FIGURE 2, the hinge device comprises a seat arm 15 and a back rest arm 16 each pivotally connected to a pair of connector links 17, for relative angular movement about respective parallel pivot pins 18. In FIGURE 2 one of the connector links has been removed to show the construction of the seat and back rest arms and the arrangement of the two links can be seen in FIGURE 6.

The seat arm 15 has four ratchet type teeth 20 arranged on a section of the circumference of a pitch circle concentric with the pivot pin 18 connecting the seat arm to the connector links. The back rest arm has a single tooth 22 which will engage with the teeth 20 on the seat arm when the back rest and seat arms are in a required relative disposition. Angular movement of the back rest arm 16 relative to the connector links 17 in an anti-clockwise direction as viewed in FIGURE 2, is prevented by the face 19 on the connector link 17 abutting the lateral projection 21 on the back rest arm 16.

When it is desired to alter the position of the back rest, the back rest arm is angularly moved in a clockwise direction relative to the connecting links 17 from the position shown in FIGURE 2 to that shown in FIGURE 3 wherein the single tooth 22 is out of engagement with the teeth 20 on the seat arm 15 and the face 19 is clear of the projection 21. The back rest arm 16 and the connector links 17 are now angularly moved in unison relative to the seat arm 15 to the position shown in FIGURE 4. As there is no relative movement between the back rest arm 16 and the links 17 the tooth 22 remains out of engagement with the teeth 20 while the back rest arm moves from the position shown in FIGURE 3 to that shown in FIGURE 4.

Upon attaining the position shown in FIGURE 4, the back rest arm 16 is angularly moved relative to the connector links 17 in an anti-clockwise direction as shown in FIGURE 4 to the position shown in FIGURE 5 where the tooth 22 again engages the teeth 20 on the seat arm and the face 19 abutting the projection 21. With the two arms again locked by the interfitting teeth and abutting faces, the back rest is retained in this new position and can withstand any load applied thereto by a person or persons seated or reclining on the settee.

The back rest can be returned to the position shown in FIGURE 2 by reversing the above procedure and the same procedure can be used to lock the back rest in any one of the intermediate positions determined by the number and spacing of the teeth 20 on the end of the seat arm 15.

A torsion spring 25 is located in the recess 26 formed in one of the connecting links 17 and the adjoining face of the back rest arm 16 as shown in FIGURE 6. The respective ends of the torsion spring engages apertures in the connecting link and back rest arm to urge the back rest arm in an anti-clockwise direction when viewed as in FIGURE 2 so as to normally maintain the tooth 22 in engagement with the teeth 20.

Where additional strength is required in the hinge device the back rest arm may be provided with two teeth 28 as shown in FIGURE 7 which engages adjoining teeth on the seat arm.

I claim:
1. A hinge device comprising two arms each pivotally connected at one end to a connector link for relative angular movement about respective parallel axes, said ends of the arms being arranged to interengage when the arms are in a plurality of predetermined angular relations, and one of the arms lockably engaging the connector link in each of said angular relations to prevent relative angular movement between the arms in one direction, the inter- engaging ends being releasable upon relative angular movement of the one arm relative to the connector link in the other direction.

2. A hinge device comprising two arms each pivotally connected at one end to a connector link for relative angular movement about respective parallel axes, a plurality of teeth on said end of one arm arranged in an arcuate formation concentric with the pivot axis of said one arm, a single tooth on said end of the other arm, the teeth and tooth being shaped to interlock when the one arm and the connector link are in any one of a plurality of angular positions determined by the number and spacing of the teeth, and the other arm abutting the connector link in each of said angular positions to prevent relative angular movement between the arms in one direction, the tooth being disengageable from the teeth upon relative angular movement between the other arm and the link in the opposite direction to permit angular movement of said other arm and connector link in unison relative to said one arm.

3. A hinge device as claimed in claim 2, wherein resilient means are connected between the other arm and the connector link so as to normally effect angular movement therebetween in said one direction and effect abutment between the other arm and the link and interlock said teeth and tooth.

4. A hinge device as claimed in claim 2 wherein two parallel connector links are provided, the ends of the arms being disposed therebetween, and each link being adapted to abut respective lateral projections on opposite sides of the other arm.

References Cited

FOREIGN PATENTS 1,148,050   5/1963   Germany.

MARVIN A. CHAMPION, *Primary Examiner.*

J. H. McGLYNN, *Assistant Examiner.*